Sept. 27, 1966 A. I. DRANETZ 3,275,933
SYSTEM FOR DETERMINING THE IMMITTANCE VECTOR
WHICH IS THE DIFFERENCE BETWEEN AN UNKNOWN
IMMITTANCE AND A KNOWN IMMITTANCE
Filed Nov. 4, 1964
3 Sheets-Sheet 1

INVENTOR
ABRAHAM I. DRANETZ
BY
ATTORNEY

INVENTOR
ABRAHAM I. DRANETZ

INVENTOR
ABRAHAM I. DRANETZ
ATTORNEY

United States Patent Office 3,275,933
Patented Sept. 27, 1966

3,275,933
SYSTEM FOR DETERMINING THE IMMITTANCE VECTOR WHICH IS THE DIFFERENCE BETWEEN AN UNKNOWN IMMITTANCE AND A KNOWN IMMITTANCE
Abraham I. Dranetz, Scotch Plains, N.J., assignor to Dranetz Engineering Laboratories, Inc., Plainfield, N.J., a corporation of New Jersey
Filed Nov. 4, 1964, Ser. No. 408,986
5 Claims. (Cl. 324—57)

The invention relates to a system for determining the immittance vector which is the difference between an unknown immittance and a known immittance. In particular, the invention is directed toward providing a system for obtaining a direct read-out of such a difference immittance. Immittance is defined as impedance and/or admittance in the 2d edition of the Dictionary of Electronics and Physics published in 1961 by D. Van Nostrand Company, Inc.

Broadly, the invention utilizes a circuit comprising the unknown immittance and a known immittance connected so that when a controlled A.-C. signal is impressed on the circuit, an A.-C. output signal is produced by the circuit. The controlled A.-C. signal and the A.-C. output signal are compared so that two output signals are produced which describe and define the immittance vector which is the difference between the unknown immittance and the known immittance.

It is often desirable to compare an unknown immittance with a known immittance in order to provide an accurate measurement of the unknown immittance. This is commonly done by means of a bridge arrangement which requires that the bridge be balanced in order to measure the value of the unknown immittance. There are many different circuit configurations of these bridges but most of them require that the bridge be balanced as close as possible to a zero null and ideally, to an absolute null.

Another type of system in present use consists of a bridge having an A.-C. output vector voltage given by:

$$V_0 = \frac{Z_x - Z_s}{Z_x + Z_s} V_1$$

where $V_1$ is the A.-C. vector voltage input, $Z_s$ is the known or standard vector impedance and $Z_x$ is the unknown vector impedance. For ratios of $Z_x/Z_s$ close to unity, the amplitude of the output voltage is proportional to the fractional deviation between the amplitudes of the unknown and known immittances and the phase of the output voltage relative to that of the input voltage is equal to the phase angle difference between the immittances. Likewise, for ratios close to unity, the in-phase and quadrature components of the output vector voltage are proportional to the fractional deviations between the real and imaginary components of the impedances. Such an arrangement may be used as an impedance comparator and/or as an immittance ratio measuring system, but its principal usefulness is limited to small fractional differences between known and unknown immittances due to the increasing non-linearity between the output and input voltages with increasing deviations.

For certain determinations of immittance, it is important that the absolute vector difference between the immittances be expressed as another vector immittance rather than as a ratio of immittances. Furthermore, it is often desirable that these measurements be made over relatively large difference ratios. For example, when measuring certain electro-acoustical transducers which are operating near their resonant frequency, it is often desirable to separate the motional admittance locus from the total admittance locus as plotted on a complex admittance plane. In other transducers, it is desirable to separate the motional impedance locus from the total impedance locus. Moreover, in the measurement of a complex impedance having both a time invariant complex impedance plus a time variant complex impedance, it is sometimes desirable to subtract out the time invariant complex impedance. In other cases, such as in production measurements, it is preferable to measure the vector difference between an unknown immittance and a known immittance in absolute units such as ohms or mhos rather than to merely measure the ratio between the two immittances.

Accordingly, it is an important object of the invention to provide a system for measuring the immittance vector which is the difference between a known immittance and an unknown immittance.

It is a further object of the invention to provide a circuit which produces an A.-C. output signal when at least one controlled A.-C. signal is applied thereto and to compare the A.-C. output signal and one of the controlled A.-C. signals such that two output signals are produced which define and describe the immittance vector which is the difference between the known immittance and the unknown immittance.

It is a still further object of the invention to provide such a circuit and a pair of resolvers wherein the output of one of the resolvers is a function of the difference between the real components of the unknown immittance and the known immittance and the output of the second of the resolvers is a function of the difference between the imaginary components of the known immittance and the unknown immittance, wherein the reference vector is the input signal.

It is a still further object of the invention to provide such a system wherein the detecting devices display the difference between the known immittance and the unknown immittance expressed as a third vector immittance having a defined angle and amplitude, the amplitude being given in absolute units such as ohms or mhos.

It is a still further object of the invention to provide such a system for measuring impedances.

It is a still further object of the invention to provide such a system for measuring admittances.

It is a still further object of the invention to provide a system for measuring one component of an unknown immittance.

These and other objects, advantages, features and uses will be apparent during the course of the following discussion when taken in conjunction with the accompanying drawings wherein.

Figure 1:
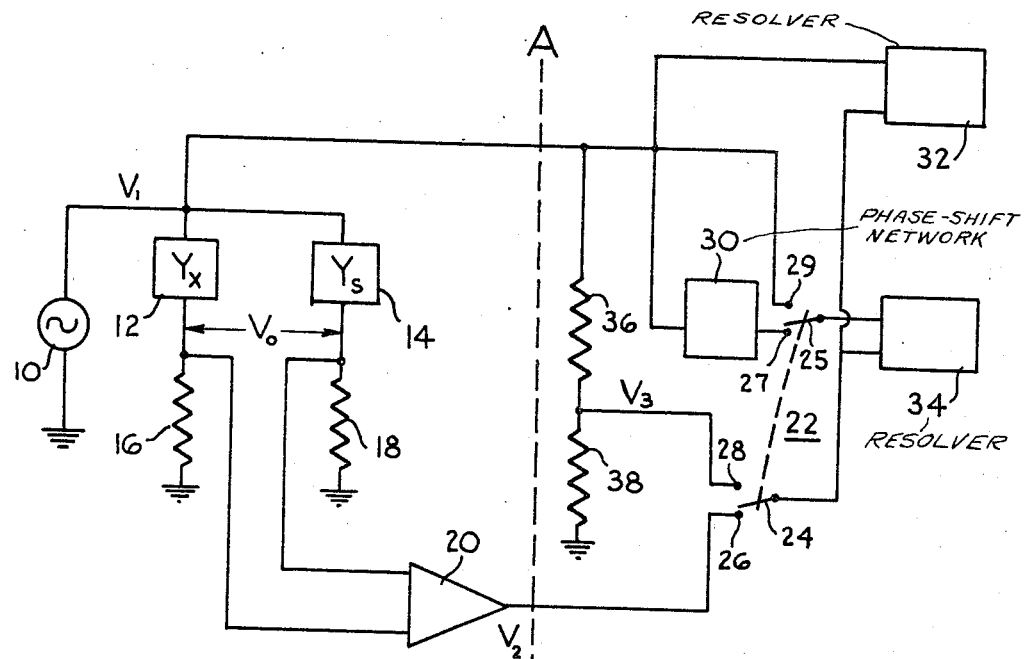
FIGURE 1 is a schematic circuit diagram for measuring the difference between an unknown admittance and a known immittance using a pair of resolvers for comparing the real and imaginary components.
Figure 2:
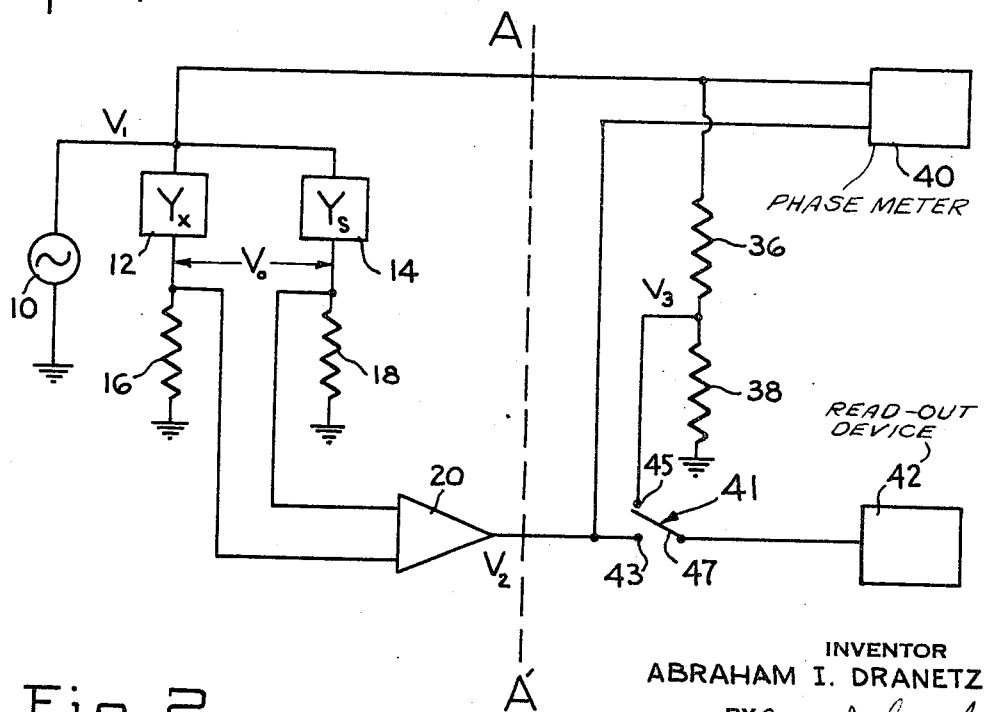
FIGURE 2 is a schematic circuit diagram similar to that of FIGURE 1 wherein a phase meter is used for measuring the phase and a voltmeter is used for measuring the amplitude of the difference admittance vector between the known admittance and the unknown admittance.
Figure 5:
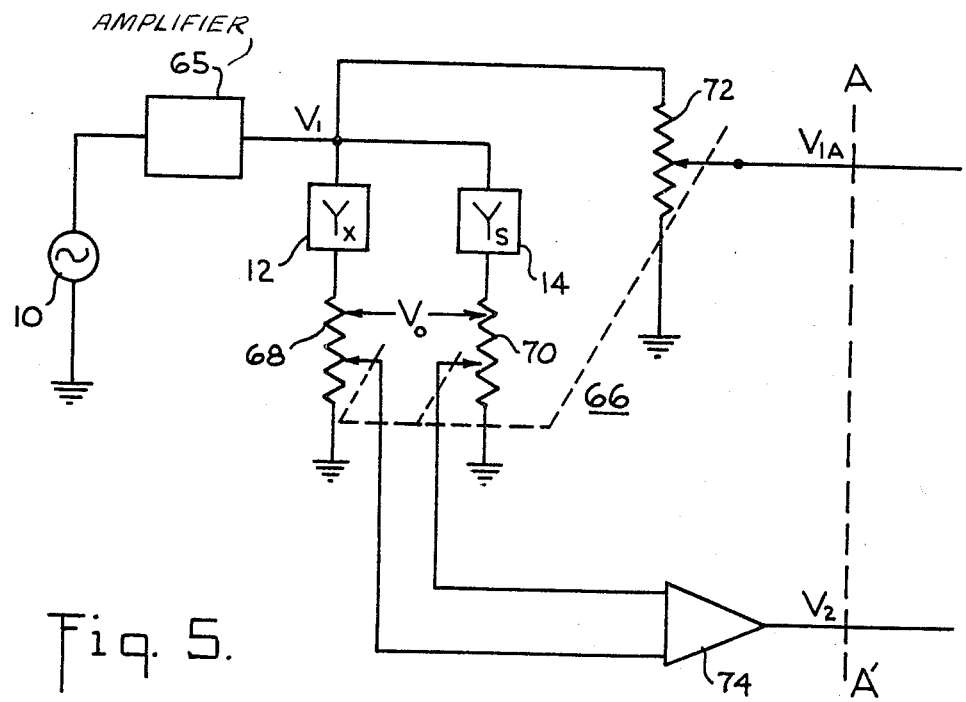
Figure 6:
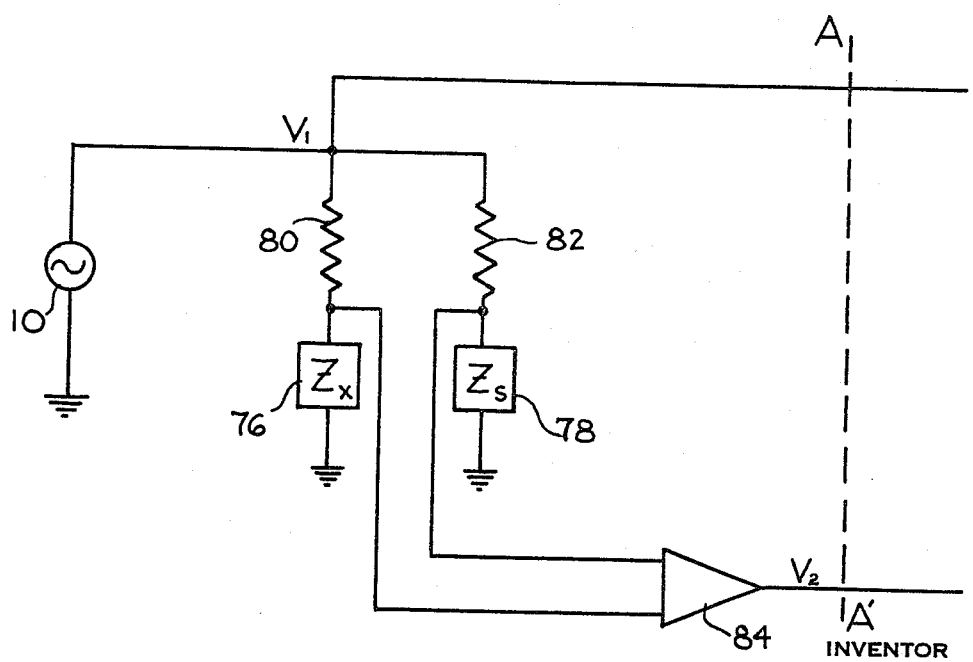

FIGURE 5 is a schematic circuit diagram of a system for measuring the difference between admittances under high power and which may be used with either the resolvers of FIGURE 1 or the meters of FIGURE 2; and FIGURE 6 is a schematic circuit diagram for measuring the difference in impedance between a known impedance and an unknown impedance and which may be used with the resolvers of FIGURE 1 or the meters of FIGURE 2.

In the drawings, wherein, for the purpose of illustration, are shown several embodiments of the circuits showing the system of the invention, the numeral 10 designates a source of controlled A.-C. signal. In FIGURE 1, source 10 produces a constant voltage $V_1$ to be applied to a four terminal, four legged bridge circuit, the legs of which are unknown admittance 12, known admittance 14, resistor 16 and resistor 18. Resistors 16 and 18 are equal and are much lower in value than the impedances of both the known and unknown admittances 12 and 14 with which they are respectively connected in series. The voltage $V_1$ is applied across two opposite terminals of the bridge circuit so that it is impressed across the parallel circuit of admittance 12 in series with resistor 16 and admittance 14 in series with resistor 18. An A.-C. output signal $V_0$, which results from the unbalanced condition of the bridge, is taken from the other opposite terminals of the bridge and is amplified by amplifier 20 whose output is designated as $V_2$.

To the right of dashed line A–A' in FIGURE 1 there is illustrated one system for measuring the differences between the real components and the imaginary components of the unknown admittance 12 and the known admittance 14. To the right of dashed line A–A' in FIGURE 2 there is illustrated means for measuring the phase of the admittance which is the difference between the unknown admittance 12 and the known admittance 14 and for measuring the amplitude of the vector difference between the unknown admittance 12 and the known admittance 14. The circuits illustrated in FIGURES 3 through 6 may use either of the systems illustrated to the right of dashed lines A–A' of FIGURES 1 and 2. The dashed lines A–A' of FIGURES 3 through 6 show the points at which the right portions of FIGURES 1 and 2 are connected to the respective circuits.

Switch 22 of FIGURE 1 is provided to permit the system to be calibrated. Arms 24 and 25 are ganged and respectively make contact with terminals 26 and 27 when an unknown immittance is being measured and with terminals 28 and 29 when the measuring system is being calibrated. Resolvers 32 and 34 are preferably of the type used in the Model 100B Complex Impedance-Admittance Meter manufactured by Dranetz Engineering Laboratories, Inc. of Plainfield, New Jersey.

The difference between the voltages across resistors 16 and 18 is fed to amplifier 20 whose output is a voltage $V_2$. The amplitude of voltage $V_2$ is proportional to the amplitude of the vector which is the difference between the voltages across resistors 16 and 18 and the phase angle (relative to $V_1$) is equal to the phase of the vector which is the difference between known admittance 14 and unknown admittance 12. The A.-C. voltages $V_1$ and $V_2$ are fed to the inputs of resolvers 32 and 34 as described below.

Resolver 32 produces a D.-C. voltage output which is proportional to the product of the amplitude of $V_2$ and the cosine of the angle between $V_2$ and $V_1$ so that its D.-C. output is proportional to the difference between the in-phase components of $Y_x$ and $Y_s$. Voltages $V_1$ and $V_2$ are also fed to the inputs of resolver 34 except that voltage $V_1$ is rotated 90° in phase by 90° phase shift network 30 before being fed to the input of resolver 34. Resolver 34 produces a D.-C. voltage which is proportional to the difference in the imaginary components of admittances $Y_x$ and $Y_s$. The real or in-phase components are the conductances of the two admittances and the imaginary or quadrature components are the susceptances of the two admittances. The outputs of the resolvers can be connected to analog voltmeters, digital voltmeters, recording instruments, limit relays, oscilloscopes or other devices.

The system is calibrated by moving switch 22 so that arms 24 and 25 respectively contact terminals 28 and 29. In this calibration position the 90° phase shift network is disconnected from the circuit and the phase reference voltage $V_1$ is applied to both resolvers. The gain control in each resolver is adjusted to provide a predetermined D.-C. output level, which can be considered a full scale calibration. Resistance 38 is much smaller than resistance 36, such that the A.-C. level necessary to provide full scale outputs is $$V_3 \approx V_1\left(\frac{R_{38}}{R_{36}}\right)$$

Since $V_2 = V_1 R_{16}(Y_x - Y_s)G$, where $R_{16} = R_{18}$ and $G$ is the voltage gain of amplifier 20, it will be seen that the D.-C. outputs will read full scale when the in-phase and quadrature components of $R_{16}(Y_x - Y_s)G$ are each equal to $R_{38}/R_{26}$. Since $R_{16}$ and $G$ are preset in value, their selection will determine the full scale range. For differences less than full scale, the outputs will be proportional to the differences.

The left hand portion of FIGURE 2 is the same as the left hand portion of FIGURE 1. The difference between them resides in the portions on the right side of both figures. Voltage $V_2$ which is a function of the difference voltage across the two resistors 16 and 18 is fed to read-out device 42 such as an A.-C. voltmeter or a detector whose output is a voltage which may be used for recording or a visual display. Voltages $V_1$ and $V_2$ are fed to the inputs of phase meter 40 which may read directly in phase and which may also have a voltage output which is a function of the phase of the admittance difference between the known and the unknown admittances. This output voltage may be used for recording or may be visually displayed, as required. Amplitude calibration of the voltage detector is accomplished by switch 41 which can be used to measure voltage $V_3$ or $V_2$. The calibration factor for vector amplitude immittance difference is similar to that shown for FIGURE 1. When arm 47 of switch 41 contacts terminal 45, the system is in its calibrating position. When arm 47 contacts terminal 43, the system is in its operating position. Phase meter 40 is provided with its own calibration controls so that an external calibration circuit need not be provided for it. Preferably, phase meter 40 is fed by an amplifier which for the purpose of this description is considered to be a part of the phase meter. The model 405 phase meter manufactured by Ad-Yu may be used for the phase measurements of the invention.

Figure 3:
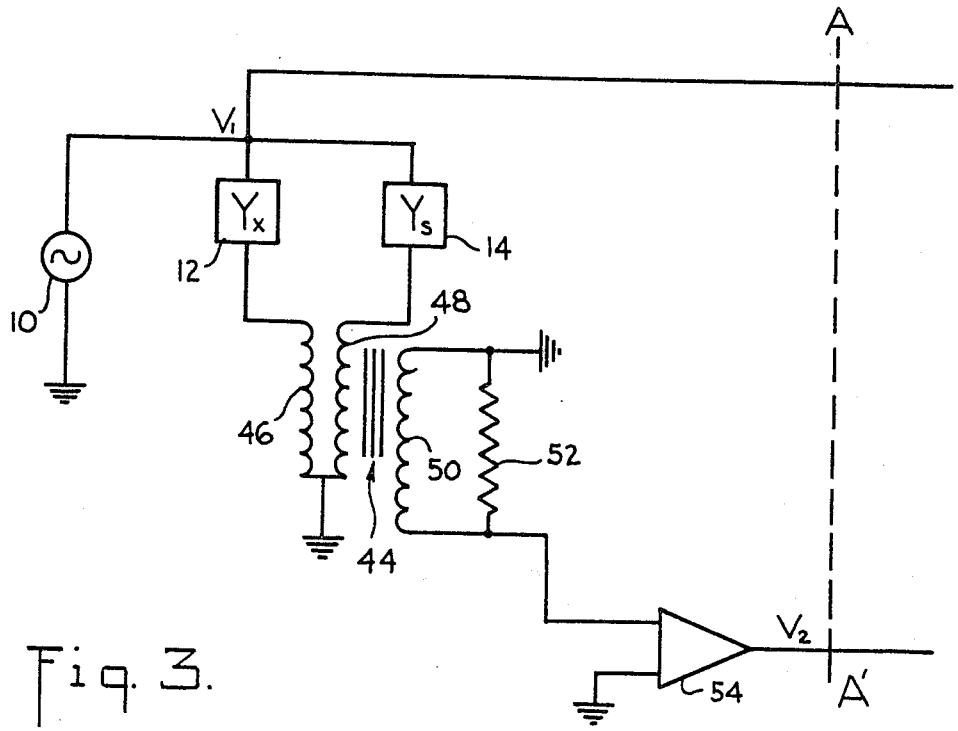
FIGURE 3 is a schematic circuit diagram of a circuit for producing the A.-C. output signal to be compared with the controlled A.-C. input signal using either the resolvers of FIGURE 1 or the meters of FIGURE 2.

In FIGURE 3, differential current transformer 44 is used to produce the difference signal to be indicated by the resolvers of FIGURE 1 or the meters of FIGURE 2. Transformer 44 comprises primary windings 46 and 48 and secondary winding 50. Resistor 52 is connected across secondary winding 50. Winding 46 is in series with unknown admittance 12 and winding 48 is in series with known admittance 14. These two series circuits are connected in parallel across the source of controlled voltage 10 so that the controlled A.-C. voltage is applied across both of them. The current transformer is designed to inject a very small insertion impedance in series with $Y_x$ and $Y_s$, typically less than 1% of the impedance of these immittances. The transformer 44 has the characteristic to produce a vector voltage across resistor 52 which is proportional to the vector difference between the currents through the primary windings 46 and 48. The phase of this voltage across the resistor 52 is equal to the difference in phase between the resultant current and the voltage input $V_1$. Hence, the voltage across resistor 52 is a measure of the vector difference of the unknown admittance and the known admittance. The voltage across resistor 52 is fed to amplifier 54 whose output is designated as $V_2$. Voltages $V_1$ and $V_2$ are compared by the systems of FIGURES 1 and 2. Instead of the calibration factor $R_{16}(Y_x-Y_s)G$, as used with reference to FIGURE 1, the calibration factor in this case is $S(Y_x-Y_s)G$, where S is the sensitivity referred to each of the identical primary windings (e.g., in volts/amp).

Figure 4:
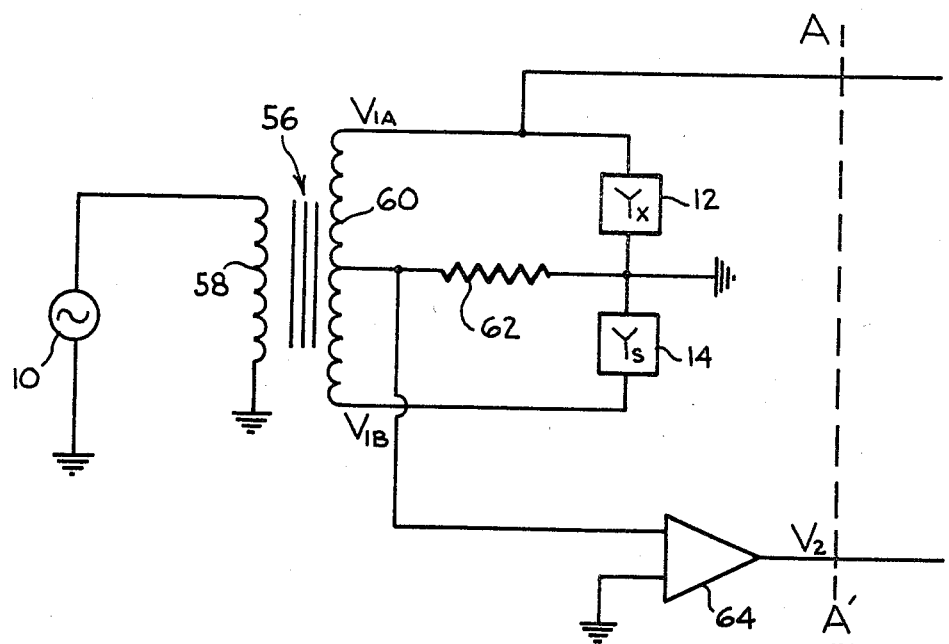
FIGURE 4 is a schematic circuit of still another circuit which may be used with either the resolvers of FIGURE 1 or the meters of FIGURE 2.

In FIGURE 4, source of signal 10 is connected across primary winding 58 of transformer 56. Secondary 60 of the transformer has a high mutual coupling such that voltage $V_{1A}$ is equal to and opposite in phase to voltage $V_{1B}$. The voltage $V_{1A}$ is used for phase reference and also produces a current through the series circuit of admittance 12 and resistor 62, this resistor being much smaller than the impedance of either $Y_x$ or $Y_s$. Simultaneously, voltage $V_{1B}$ produces a current through the series circuit of admittance 14 and resistor 62. The difference between these currents produces a voltage across the resistor 62 which is proportional to and has the phase of the difference in the admittances $Y_x$ and $Y_s$. This voltage is amplified by amplifier 64 whose output is $V_2$. Voltages $V_{1A}$ and $V_2$ are compared by the systems of FIGURES 1 and 2 as described heretofore.

In FIGURE 5 there is shown a system for measuring the admittance which is the difference between admittances 12 and 14 while high power is being applied to both of them. The circuit is similar to that of the left side of FIGURE 1, but voltage $V_1$, which is the output of power amplifier 65, is substantially higher than that required by the resolving or metering systems of either FIGURE 1 or 2. Thus the voltages are attenuated by the ganged potentiometers 68, 70 and 72. It is particularly important that all three potentiometers track closely to each other. The difference voltage $V_0$, after attenuation, is amplified by amplifier 74 whose output is $V_2$. Voltages $V_{1A}$ and $V_2$ are compared by the systems of FIGURES 1 and 2 as described heretofore. The system of FIGURE 3 may be used for measurements under high power by increasing the voltage level $V_1$, inserting a potentiometer (such as potentiometer 72) in the reference portion of the circuit, and by making resistor 52 a potentiometer. The two potentiometers should be ganged and should track closely. Amplifier 54 is connected across the output of the potentiometer.

In FIGURE 6 there is illustrated a system for measuring the impedance which is the difference between impedances using the measuring systems of FIGURES 1 and 2. In the measurement of the difference in admittances of FIGURES 1 through 5 the controlled input signal is a constant voltage. In the measurement of the difference of impedances of FIGURE 6 the controlled input signals are constant currents of equal amplitude and phase in each leg. The circuit is a four terminal, four legged bridge, the legs of which are unknown impedance 76, known impedance 78, and equal resistors 80 and 82. The source of signal is applied to two opposite terminals of the bridge so that the signal is impressed across the parallel circuit of impedance 76 and resistor 80 in series and impedance 78 and resistor 82 in series. The resistances of resistors 80 and 82 are much higher than the impedances of impedances 76 and 78. Since this is so, the curernts through the two series circuits are essentially constant and controlled by the resistors and are thereby essentially independent of impedances 76 and 78. Thus, the voltages across the impedances 76 and 78 are proportional to and carry the phase of the respective impedances. Amplifier 84 is connected across the other opposite terminals of the bridge and its output $V_2$ is proportional to the impedance which is the difference between impedance 76 and impedance 78. Voltage $V_2$ has the phase relative to $V_1$ of the impedance which is the difference between the unknown impedance and the known impedance.

The impedance measuring technique of FIGURE 6 may be extended to include other current measuring techniques wherein the currents through $Z_x$ and $Z_s$ are kept constant. One method is to replace resistors 80 and 82 with current transformers in conjunction with feedback networks adjusted to keep constant current through the impedances.

Voltages $V_1$ and $V_2$ are compared as heretofore described. In the case of the resolvers, the output of resolver 32 will be the difference in the resistive components of the impedances and the output of resolver 34 will be the difference in the reactive components of the impedances. In the case of the system of FIGURE 2, the output of the voltmeter will indicate the amplitude of the difference impedance vector and the output of the phase meter will indicate the phase of the difference impedance vector.

It is also within the contemplation of the invention to employ its system to determine one component of an unknown immittance. It is readily obvious that either the real or imaginary portion of an immittance may be measured by a resolver of FIGURE 1. Similarly, either the amplitude or the phase of an unknown immittance may be measured by a meter of FIGURE 2. It is also within the contemplation of the invention to utilize its system to compare two immittances as well as to determine the value of an unknown immittance from the immittance vector which is the difference between an unkown immittance and a known immittance.

While the invention has been disclosed in relation to specific examples and embodiments, I do not wish to be limited thereto, for obvious modifications, changes, alterations and adjustments will occur to those skilled in the art without departing from the spirit and scope of the invention.

What is claimed is:

1. A system for determining the value of an unknown immittance comprising:
   a source of controlled A.-C. signal;
   an unknown admittance, a known admittance, and a pair of resistors of equal value connected in a four terminal, four legged bridge wherein the known admittance is connected in the first leg, the unknown admittance is connected in the second leg, one of the pair of resistors is connected in the third leg, and the other of the pair of resistors is connected in the fourth leg;
   each of the resistors having a conductance much greater than the admittance of each of the known admittance and the unknown admittance;
   the controlled A.-C. signal being fed to the bridge across two opposite terminals, one of such terminals being the common junction of the two resistors, the other of such terminals being the common junction of the known admittance and the unknown admittance;
   an A.-C. output signal being produced across the other two opposite terminals of the bridge;
   a pair of resolvers, each having two inputs;
   means connecting the terminals of the bridge across which the A.-C. output signal is produced to one of the inputs of each of the pair of resolvers;
   means connecting the terminals of the bridge across which the source of controlled A.-C. signal is connected to the other input of the first of the pair of resolvers such that the output of the first resolver is proportional to the difference between the conductances of the unknown admittance and the known admittance;

a 90° phase shift network having an input and an output;

means connecting the source of controlled A.-C. signal to the input of the 90° phase shift network and means connecting the output of the 90° phase shift network to the other input of the second of the pair of resolvers such that the output of the second resolver is proportional to the difference between the susceptances of the unknown admittance and the known admittance.

2. The system of claim 1 including:

a power amplifier connected between the source of controlled A.-C. signal and the first two opposite terminals of the bridge;

the first of the pair of resistors being a variable potentiometer having two outer terminals and a third variable connection intermediate the outer terminals;

the second of the pair of resistors being a variable potentiometer having two outer terminals and a third variable connection intermediate the two outer terminals;

a third potentiometer having two outer terminals and a third variable connection intermediate the two outer terminals and having its two outer terminals connected across the first two opposite terminals of the bridge;

the variable connections of the three potentiometers being ganged;

an amplifier having an input and an output;

an A.-C. output signal being produced across the variable connections of the first potentiometer and the second potentiometer and means for feeding the A.-C. output signal to the input of the amplifier;

the A.-C. output signal being amplified by the amplifier and fed to one of the inputs of each of the pair of resolvers;

the variable connection of the third potentiometer being connected to the other input of the first of the pair of resolvers and to the input of the 90° phase shift network.

3. A system for determining the value of an unknown immittance comprising:

a source of controlled A.-C. signal;

an unknown admittance, a known admittance, and a differential current transformer having two primary windings and a secondary winding;

the known admittance being connected in a first series circuit with the first of the primary windings of the differential transformer;

the unknown admittance being connected in a second series circuit with the second of the primary windings of the differential transformer;

the insertion impedance of the two primary windings in the first series circuit and the second series circuit being less than 1% of the impedances of the known admittance and the unknown admittance;

the first series circuit and the second series circuit being connected in parallel across the source of controlled A.-C. signal;

a resistor connected across the secondary winding of the differential transformer;

an A.-C. output signal being produced across the secondary winding of the differential transformer;

a pair of resolvers, each having two inputs;

means connecting the secondary winding of the differential transformer to one of the inputs of each of the resolvers;

means connecting the source of controlled A.-C. signal to the other input of the first of the pair of resolvers such that the output of the first resolver is proportional to the difference between the conductances of the unknown admittance and the known admittance;

a 90° phase shift network having an input and an output;

means connecting the source of controlled A.-C. signal to the input of the 90° phase shift network and means connecting the output of the 90° phase shift network to the other input of the second of the pair of resolvers such that the output of the second resolver is proportional to the difference between the susceptances of the unknown admittance and the known admittance.

4. A system for determining the value of an unknown immittance comprising:

a source of controlled A.-C. signal;

a transformer having a primary winding and a secondary winding, the secondary winding having a first outer terminal, a second outer terminal and a terminal intermediate the two outer terminals;

an unknown admittance and a known admittance;

the source of controlled A.-C. signal being connected across the primary winding of the transformer;

the unknown admittance and the known admittance being connected in series across the outer terminals of the secondary winding;

a resistor connected between the intermediate terminal of the secondary winding and the common junction of the known admittance and the unknown admittance such that a voltage is produced across the resistor;

a pair of resolvers, each having two inputs;

means for feeding the voltage produced across the resistor to one of the inputs of each of the resolvers;

means connecting the first outer terminal of the secondary winding of the transformer to the other input of the first of the pair of resolvers such that the output of the first resolver is proportional to the difference between the conductances of the unknown admittance and the known admittance;

a 90° phase shift network having an input and an output;

means connecting the first outer terminal of the secondary winding of the transformer to the input of the 90° phase shift network and means connecting the output of the 90° phase shift network to the other input of the second of the pair of resolvers such that the ouptut of the second resolver is proportional to the difference between the susceptances of the unknown admittance and the known admittance.

5. A system for determining the value of an unknown immittance comprising:

a source of controlled A.-C. signal;

an unknown impedance, a known impedance, and a pair of resistors of equal value connected in a four terminal, four legged bridge wherein the known impedance is connected in the first leg, the unknown impedance is connected in the second leg, one of the pair of resistors is connected in the third leg, and the other of the pair of resistors is connected in the fourth leg;

each of the resistors having a resistance much greater than the impedance of each of the known impedance and the unknown impedance;

the controlled A.-C. signal being fed to the bridge across two opposite terminals thereof, one of such terminals being the common junction of the two resistors, the other of such terminals being the junction of the known impedance and the unknown impedance;

an A.-C. output signal being produced across the other two terminals of the bridge;

a pair of resolvers, each having two inputs;

means connecting the terminals across which the A.-C.

output signal is produced to one of the inputs of each of the pair of resolvers;

means connecting the source of controlled A.-C. signal to the other input of the first of the pair of resolvers such that the output of the first resolver is proportional to the difference between the resistances of the unknown impedance and the known impedance;

a 90° phase shift network having an input and an output;

means connecting the source of controlled A.-C. signal to the input of the 90° phase shift network and means connecting the output of the 90° phase shift network to the other input of the second of the pair of resolvers such that the output of the second resolver is proportional to the difference between the reactances of the unknown impedance and the known impedance.

References Cited by the Examiner

UNITED STATES PATENTS

| | | | |
|---|---|---|---|
| 2,309,490 | 1/1943 | Young | 324—57 |
| 2,554,164 | 5/1951 | Wojciechowski | 324—57 |
| 2,576,059 | 11/1951 | Wojciechowski | 324—57 |
| 2,592,750 | 4/1952 | Selove | 324—57 |
| 2,595,675 | 5/1952 | Jaynes | 324—57 |
| 2,639,411 | 5/1953 | Schafer | 324—57 X |
| 2,735,064 | 2/1956 | Salzberg | 324—57 |
| 2,919,399 | 12/1959 | Brown et al. | 324—57 |
| 2,968,180 | 1/1961 | Schafer | 324—57 X |
| 3,027,511 | 3/1962 | Farr | 324—57 |
| 3,031,614 | 4/1962 | Calvert | 324—57 |
| 3,039,050 | 6/1962 | Krohn | 324—57 |

WALTER L. CARLSON, *Primary Examiner.*

E. E. KUBASIEWICZ, *Assistant Examiner.*